United States Patent [19]

Silverman

[11] Patent Number: 4,566,484
[45] Date of Patent: Jan. 28, 1986

[54] LIQUID LEVEL CONTROL APPARATUS

[75] Inventor: Daniel Silverman, Tulsa, Okla.

[73] Assignee: William R. Walters, Cleveland, Okla.

[21] Appl. No.: 687,578

[22] Filed: Dec. 28, 1984

[51] Int. Cl.[4] ..................... F16K 21/18; F16K 31/128
[52] U.S. Cl. ..................................... 137/403; 137/414; 137/453; 251/46
[58] Field of Search ............... 137/403, 406, 408, 413, 137/414, 415, 453; 251/45, 46

[56] References Cited

U.S. PATENT DOCUMENTS

| | | | |
|---|---|---|---|
| 2,586,410 | 2/1952 | Williams | 137/403 |
| 2,620,818 | 12/1952 | Symmons | 137/403 |
| 2,685,301 | 8/1954 | Dreier | 137/403 |
| 3,586,017 | 6/1971 | Walters | 137/403 |
| 3,895,645 | 7/1975 | Johnson | 137/403 |
| 4,094,327 | 6/1978 | Brandelli | 137/403 |

Primary Examiner—George L. Walton
Attorney, Agent, or Firm—Head, Johnson & Stevenson

[57] ABSTRACT

An apparatus for controlling the flow of liquid from a conduit into a tank to maintain a selected level, which is an improvement on the conventional type of float-operated flow valves which use a diaphragm clamped between two flanges and positioned over the end of the conduit through which liquid is supplied at a selected pressure. There is a small opening in the center of the diaphragm and there is a second small opening in the second flange of the flow means. The improvement of this invention, is the use, instead of a float mechanism, a pressure-sensitive diaphragm which is responsive to the hydrostatic pressure in the liquid at the level of immersion of the diaphragm. The diaphragm is adapted to close and open the second small opening, and thus to control the flow through the first valve.

7 Claims, 1 Drawing Figure

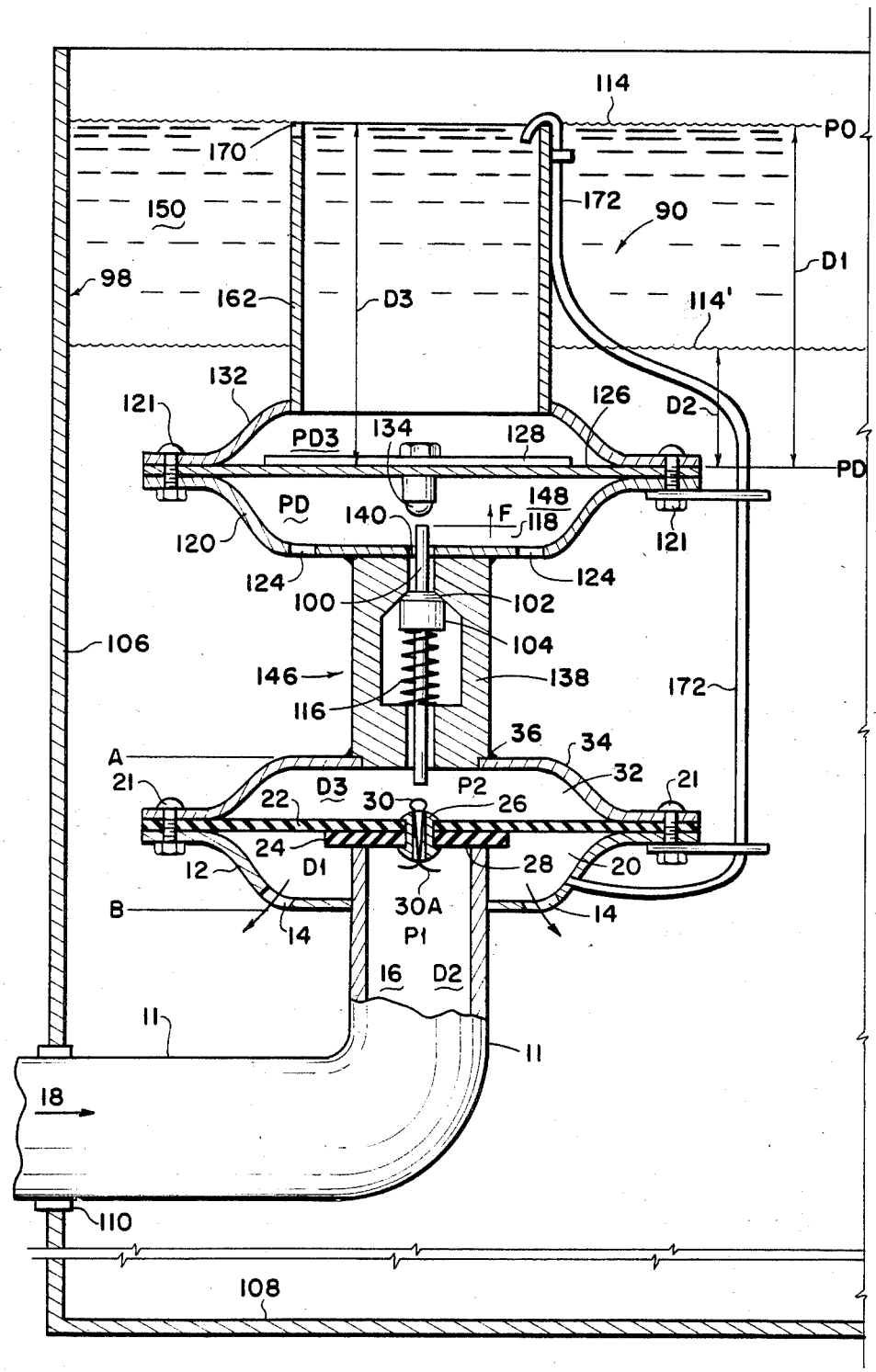

LIQUID LEVEL CONTROL APPARATUS

CROSS REFERENCE TO RELATED PATENT

This invention is related to U.S. Pat. No. 4,352,371 entitled "Low High Flow Rate Valve" which was issued Oct. 5, 1982. U.S. Pat. No. 4,352,371 is entered by reference into this application.

BACKGROUND OF THE INVENTION

This invention lies in the field of liquid control valves. More particularly, it concerns flow valves which are used to control the flow of liquid from a conduit into a receptacle, such as, for example a stock tank for providing drinking water for cattle, to maintain a selected level of liquid in the tank. U.S. Pat. No. 4,352,371 is an example of a number of patents which disclose such float-controlled valves. In this invention, a pressure or level sensitive mechanism other than a float is used to control the closing and opening of the second small opening.

While the float operated mechanism to close and open the second small orifice works beautifully under normal conditions, in the wintertime, where the tanks are outdoors and are subject to freezing temperatures, such floats are normally subject to damage by the ice cover and the breaking of the ice cover of the water in the tank. This invention is directed to providing a means other than a float operated mechanism to control the flow of liquid from the conduit, and particularly to a substantially completely submerged mechanism.

SUMMARY OF THE INVENTION

It is a primary object of this invention to provide an improved type of flow control valve, such as, for example, a float-controlled valve such as illustrated in FIG. 1 of U.S. Pat. No. 4,352,371, and to replace it with a different type of level or pressure sensitive means, which is capable of being entirely submerged below the surface of the liquid.

While this invention can be used with any kind of liquid and with any type of contaniner or tank, open or closed, etc. it will, for example be described in conjunction with water as the liquid, and an open, outdoor tank. These conditions are only by way of example, however, and are not limiting.

The invention comprises the combination of two parts, (a) a flow valve, and (b) a pressure sensitive mechanism to control the flow valve. No outside source of power is required, and whatever forces needed are provided entirely by the hydrostatic pressure of the liquid in which the apparatus is submerged.

These and other objects are realized and the limitations of the prior art are overcome in this invention by providing a valve similar to those controlled by a float, for example as in U.S. Pat. No. 4,352,371, to monitor the level of water in a vessel or tank. A pipe, through which water flows from a pressurized source into the tank has a flange surrounding the end of the pipe. A flexible diaphragm covers the flange and the end of the water pipe, such that when the pressure of water on the second side of the diaphragm reaches a critical value, it presses against the opening in the pipe to shut off the flow of water. A second short pipe attached to a similar flange is clamped over the second side of the diaphragm, to the first flange, to provide a water tight seal around the periphery of the diaphragm.

A first orifice of small size is drilled through the diaphragm to permit a trickle of selected low flow rate of water through the first orifice even though the main flow of water is closed off by the diaphragm. The second short pipe is terminated with a second small orifice of selected area. A float-operated arm carrying a closure tip is provided to press against the second small orifice when the level of the water reaches a selected value.

This arrangement provides a closed small volume or chamber on the second side of the diaphragm, which has an entry opening of small size at the first orifice, and a second exit opeing of slightly larger size at the second orifice. When the second orifice is closed the pressure $P2$ in that chamber reaches the value of pressure less than $P1$ inside the pipe. Because of the larger area of the diaphragm compared to the area of the first pipe, there is a force pressing the closure portion of the diaphragm against the end of the first pipe which is greater than the force trying to push it away from the pipe and shuts off the flow of water.

The two orifices in series comprise a pressure drop mechanism in which the pressure $P2$ in the chamber can vary between a value $P1$ equal to that in the first pipe, to a value of atmospheric pressure $P0$, when the second orifice is open. Of course, when the pressure $P2$ on the second side is zero, the diaphragm is forced aside by the pressure $P1$ in the first pipe, and a large flow is permitted into the tank. When the area of opening of the second orifice is closed, then the pressure in the second chamber is some value $P2$ which is intermediate between the value maximum of $P2$ and atmospheric pressure, $P0$.

Depending upon the ratio of areas of the diaphragm $A1$ and the area $A2$ of the opening in the first pipe, it is clear that when the force pressing the diaphragm against the first pipe is equal to the pressure $P1$ in the first pipe, times the are $A2$ of the first pipe, flow will be cut off. Therefore, the unit pressure acting against the larger area $A1$ of the diaphragm can shut off the flow even though the pressure $P2$ is much less than $P1$. In fact, $P2$ can be quite low, which would result when the ratio of area of opening $A4$ of the second orifice, to the area $A3$ of opening of the first orifice is a selected value. Thus, when the second orifice is opened to its widest value and the pressure in the chamber is below the critical pressure $PC$, then the flow goes to a high rate.

The problem is to close and open the second small orifice by a mechanism other than the float apparatus. In this invention the second small pipe of the patent comprises a cylindrical block which is attached and sealed to the second flange. This has an axial opening into which is fitted a valve mechanism which provides the second small orifice and which is adapted to be moved between a closed position and an open position by a second diaphragm.

A second pair of flanges and a corresponding second diaphragm clamped therebetween is positioned so that the diaphragm is capable of moving in a direction to open this valve mechanism whenever the hydrostatic pressure on the underside of the second diaphragm is less than that due to the hydrostatic pressure when the liquid level is at the desired level. Thus, when the liquid level is too low the second diaphragm moves downward and opens the second small orifice which permits the first diaphragm to move away from the end of the conduit and permit liquid to flow into the tank. As the level rises and this pressure rises, the second diaphragm then moves upwardly, permitting the small valve mechanism to close which builds up pressure on the back side of the first diaphragm and closes the end of the conduit.

The pressure on the bottom side of the second diaphragm is exposed to the hydrostatic pressure in the liquid at the depth of immersion of the second diaphragm, plus atmospheric pressure on the surface of the water. The upper side of the second diaphragm is exposed to atmospheric pressure plus a constant hydrostatic pressure of water in an open top pipe which is continually being filled to overcome the effects of evaporation, etc.

BRIEF DESCRIPTION OF THE DRAWINGS

These and other objects and the advantages of this invention and a better understanding of the principles and details of the invention will be evident from the following description taken in conjunction with the appended drawing which illustates schematically one embodiment of this invention.

DETAILED DESCRIPTION OF THE PREFERRED EMBODIMENT

This invention can be used with any kind of liquid, such as water, chemicals, or hydrocarbon liquids, etc., and can be used to control the level in any kind of container, opened or closed. However, it will be illustrated in detail with respect to the flow of water under pressure from a pipe or conduit into an open tank such as a stock tank, which is provided in the field for the purpose of providing drinking water for animals. This choice is purely for the purpose of clarifying the design of the apparatus which will be described, and this invention is not limited in any way to specific types of liquids and/or containers.

References has been made to U.S. Pat. No. 4,352,371 entitled "Low High Flow Rate Valve" issued Oct. 5, 1982, which has been entered by reference into this application. Part of FIG. 1 of that patent is copied as part of the drawing of this application, the description of which will be substantially the same as that described in the patent.

Referring now to the FIGURE, a supply of pressurized water, not shown, provides a flow of water in accordance with arrow 18 into and through a pipe 11 which has a terminal opening 28 of diameter D2. This pressure in the space 16 in the first pipe 11 is P1.

A circular flange 12 of considerably larger diameter D1, surrounds the end 28 of the pipe 11. A flexible diaphragm 22 of the same diameter as the flange 12 is sealed against the flange 12. The flexible diaphragm carries a closure plate 24 on the side facing the pipe 11, so that when a sufficient force is applied to the second side of the diaphragm to press the closure plate 24 against the end 28 of the pipe 11, the flow can be shut off. A small orifice 30 is provided in the closure plate 24, and diaphragm 22 so that flow can go from space 16 in the pipe 11 through the first orifice 30 to the second side 32 of the diaphragm. The diameter of the first small orifice is D3. This first small orifice can be conveniently drilled in a rivet 26 which holds the closure plate 24 to the diaphragm 22. A second short pipe 138 is attached to a second flange 34 of equal size to the first flange 12, which is clamped against the second side of the flexible diaphragm to the first flange by means such as screws 21, or equivalent means, so as to seal the diaphragm between the two flanges. The space between the first flange 12 and the diaphragm is indicated by numeral 20, and this space is vented to the atmosphere by at least one opening 14. Thus, when flow is not shut off from pipe 11 by the closure plate 24, the flow from the pipe 11 will exit through the opening 14 into the tank. The tank is shown by number 106 having a water level 114. The space or volume of the chamber on the opposite side of the diaphragm 22 from the pipe 11 is indicated by numeral 32, and there is a pressure in the water in the space 32 indicated as P2.

A second small orifice 140 is provided on the end of the short pipe 138. This is closed by means of a closure tip 104, which can be of elastomeric material, as is well known in the art, and is pressed against the opening 140 by means of spring 116.

When the second orifice 140 is closed off, water still continues to flow through the first orifice 30 into the space 32 and will continue to flow until the pressure P2 in space 32 is equal to some value such that P2 times the area of the diaphragm is equal to P1 times the area of the end 28 of the pipe 11. Because the area of the diaphragm is many times larger than the area of the pipe it is clear that a pressure in the space 32 much lower than P1 will be sufficient to provide a closure force against the end 28, equal to that due to the pressure P1 in the first pipe 11 over the area of the pipe.

When the level 114 drops the second small orifice 140 opens, permitting liquid to flow from space 32, until the total force on the first diaphragm is too low to hold the closure pad 24 against the opening 28, and liquid runs from the conduit to raise the level of liquid in the tank.

Referring now to the drawing of this application there is shown schematically a vertical cross-section through the complete apparatus of this invention. The tank is indicated in general by the numeral 98. The portion of the drawing between the points A and B is substantially the same as the corresponding part of FIG. 1 of the patent. Water conduit 11 is shown entering through the sidewall 106 of the tank. This conduit 11 is sealed by means 110, well known in the art. The depth of water is not controlled in any way and the bottom 108 of the tank can be as deep as desired. However, the range of adjustment of the surface 114 of water is limited to a depth D since the second diaphragm 126 must be below the surface of the water.

The first short pipe 138 differs from the pipe 38 in being a heavy walled tube, and constitutes a first valve mechanism or first valve means 146. The second small orifice 140 has an axial rod 100 which carries a sealing means 104 which can be of the conventional material, for example. This closure means 104 is adapted to seat against the portion 102, and thus to close the second small orifice 140. The normal position of the rod 100 is in its upper position, with the orifice 140 closed, and this is taken care of by a compression spring 116. This drawing is completely schematic and means are not shown for assembling or disassembling this first valve means 146.

There is a third flange 120 attached to the second end of the first short pipe 146. A fourth flange 132 mates with the flange 120 and serves to seal a second diaphragm 126, therebetween by means of screws 121. The flange 120 has openings 124 which communicate the internal space 148 to the water 150 in the tank.

The small rod 100 centered in the opening 140 is designed when closed to extend a distance 118 beyond the surface of the flange 120 in proximity to the second diaphragm 126. The diaphragm 126 may be a stiffening plate 128 made of metal or plastic so as to cause the diaphragm to move as a whole.

A first small opening 30 in the center of the first diaphragm 22. The short pipe 146 sealed at 36 to the second flange and into the third flange. The fourth flange 132 has a pipe 162 sealed into the center and reaching up to the level 114 at which the water will stand in the receptacle or tank 98. The water level 114 is marked with a pressure of P0, and an arrow joins that to the level of the second diaphragm which is marked PD, that is, the head of water standing above the second diaphragm 126.

The arrow D1 illustrates the depth of the water at the level of the second diaphragm. Arrow D2 indicates the depth of the water when the surface has dropped to 114' and the third arrow D3 is the level of water on top of the second diaphragm. When the receptacle is filled, the level of water 114 is the same within the pipe or stand pipe 162 and outside of the pipe 162. In other words, at the start D3 equals D1. At this time, there is a balance of hydrostatic pressure on top of and below the second diaphragm.

There is a small opening 170 in the pipe 162 which extends from the fourth flange up to the surface of the water 114.

In operation, when the levels inside and outside of the pipe 162 have equalized balanced force on the second diaphragm, thus the valve 100 will be closed. As the level of the water outside of the pipe 162 drops, say to a level 114', then there is a considerably higher hydrostatic force on top of the diaphragm than there is below the diaphragm is pushed down opening the valve 100. Thus, water flows out of the pipe 11 and into the receptacle 98 and a level of 114' will then rise until it reaches the level inside the pipe 162, after which time the diaphragm will be lifted and the valve 100 will be closed.

At the start of the cycle of lowering of the level 114 the level inside the pipe 162 is approximately the same as outside the pipe. If after a long usage water evaporates, long periods between filling and emptying the level 114 drops nothing happens until the level in the receptacle outside of the pipe drops below the level inside the pipe, at which time the valve 100 will open and allow more water to enter. The levels the same inside and outside of the pipe 162 and keeps the system in operating condition at all times.

Also shown in the drawing is a small pipe 172 inserted and sealed through the first flange 12 into the space 20 between the first flange and the first diaphragm. The pipe 172 empties into the stand pipe 162 whenever water is flowing into the receptacle, thus maintaining the pipe 162 full at all times. The pressure inside the first flange when water is flowing 18, is higher than in the receptacle due to the restriction of openings 14, the size of which is selectable, to provide sufficient head of water to flow over the top of the stand pipe.

While I have shown two ways that will keep the levels inside and outside of the pipe 162, the same, the bypass pipe 172 is preferred. It will be clear also that by the use of the pipe 172 so that the level inside pipe 162 always starts.

While the invention has been described with a certain degree of particularity, it is manifest that many changes may be made in the details of construction and the arrangement of components without departing from the spirit and scope of this disclosure. It is understood that the invention is not limited to the exemplified embodiments set forth herein but is to be limited only by the scope of the attached claim or claims, including the full range of equivalency to which each element thereof is entitled.

What is claimed is:

1. In a non-float operated, double diaphragm apparatus for controlling the flow of a pressurized liquid from the end of a pipe or conduit into a tank or receptacle open to the atmosphere to maintain a constant given level therein,
   (a) first valve means having a first flange on said conduit near its end, and a second flange having an axial opening, clamping a first diaphragm therebetween, said first diaphragm having a first small opening of first selected size through its center, and adapted to close off the end of said conduit except for said first small opening;
   (b) a short axial pipe attached and sealed at its first end to said axial opening in said second flange, and having at least a second small opening of selected second size in its second end; the improvement comprising:
   (c) second valve means in said second small opening adapted to be normally closed and opened responsive to a pressure sensitive means which is itself responsive to the hydrostatic pressure in said liquid at the depth of immersion of said pressure sensitive means; and in which
   (d) said pressure sensitive means comprises a second diaphragm, spaced above and coaxial with said first diaphragm; said diaphragm clamped between a third lower flange having at least one opening therethrough and a fourth upper flange having an opening therethrough; the lower side of said second diaphragm, exposed to a variable hydrostatic pressure in said liquid in said receptacle plus atmospheric pressure, and the upper side of second diaphragm exposed to atmospheric pressure plus a contained substantially hydrostatic force;
   (e) means to maintain said substantially constant hydrostatic force from the flow of said pressurized liquid when said first valve is open to keep second valve open until said hydrostatic pressure on said upper and lower sides of said second diaphragm is substantially equal.

2. The apparatus as in claim 1 which said constant contained substantially hydrostatic force further comprises a stand pipe sealably attached to the top of said upper flange and rising a selected distance above the second diaphragm to said given level to receive the flow of said pressurized liquid.

3. The apparatus as in claim 2 in which the diameter of said stand pipe is as large as possible, but less than the diameter of said second diaphragm; whereby when said second diaphragm drops to a lower position the height of liquid in the stand pipe will have as small a variation as possible.

4. The apparatus as in claim 2 in which the liquid level in said stand pipe is brought to top level by overflow from liquid in said tank.

5. The apparatus as in claim 2 to which the liquid level in said stand pipe is brought to top level by flow through a supply line from the space below the first diaphragm and first flange.

6. The apparatus as in claim 2 in which the liquid in said stand pipe is also exposed to the atmosphere.

7. The apparatus as in claim 1 in which said mechanical force is due to the weight of at least a single selected mass in the said stand pipe, resting on said second diaphragm plus the pressure of the atmosphere on the upper surface of the second diaphragm.

* * * * *

UNITED STATES PATENT AND TRADEMARK OFFICE
CERTIFICATE OF CORRECTION

PATENT NO. : 4,566,484
DATED : January 28, 1986
INVENTOR(S) : Daniel Silverman

It is certified that error appears in the above—identified patent and that said Letters Patent is hereby corrected as shown below:

Column 6, claim 7, lines 63-67 should be corrected to read as follows:

Line 63 after the word "said" insert the following --substantially constant hydrostatic force and said means to maintain said substantially constant hydrostatic force comprise: a--

Line 64 after the word "force" delete the words "is due to" and substitute therefor the word --of- Signed and Sealed this Twentieth Day of October, 1987

Attest:

DONALD J. QUIGG

Attesting Officer

Commissioner of Patents and Trademarks